United States Patent
Chen et al.

(10) Patent No.: US 7,123,811 B1
(45) Date of Patent: Oct. 17, 2006

(54) CIRCULAR DISPLAY DEVICE WITH A PROJECTIVE LIGHT SOURCE

(75) Inventors: Jyh-Long Chen, Hsin-Chu (TW); Sen-Nien Chung, Taipei (TW); Yi-Kai Cheng, Tainan Hsien (TW); Ming-Der Chou, Taipei (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/162,227

(22) Filed: Sep. 1, 2005

(51) Int. Cl.
G02B 6/10 (2006.01)

(52) U.S. Cl. .......... 385/146; 385/43; 385/901; 385/31; 385/33

(58) Field of Classification Search ............ 385/43, 385/129, 130, 131, 146, 147, 901, 31, 33
See application file for complete search history.

(56) References Cited

U.S. PATENT DOCUMENTS

| | | | |
|---|---|---|---|
| 4,732,442 A | * | 3/1988 | Mori .................... 362/551 |
| 4,826,273 A | * | 5/1989 | Tinder et al. ............. 362/488 |
| 4,979,026 A | * | 12/1990 | Lang et al. ............... 348/816 |
| 5,303,324 A | * | 4/1994 | Lundahl .................. 385/147 |
| 5,381,502 A | | 1/1995 | Veligdan ................. 385/115 |
| 5,387,921 A | | 2/1995 | Zhang et al. ............. 345/102 |
| 5,400,093 A | | 3/1995 | Timmers ................. 353/101 |
| 5,818,401 A | | 10/1998 | Wang ..................... 345/31 |
| 6,335,714 B1 | | 1/2002 | Wang ..................... 345/82 |
| 6,608,961 B1 | | 8/2003 | Travis ................... 385/187 X |
| 6,981,784 B1 | * | 1/2006 | Dubuc .................... 362/331 |

* cited by examiner

Primary Examiner—Brian M. Healy
(74) Attorney, Agent, or Firm—Winston Hsu

(57) ABSTRACT

A circular display includes a columnar waveguide plate and an image projection device. The upper width of the cross-section of the columnar waveguide plate is less than the bottom width of the cross-section of the columnar waveguide plate. The outer surface of the columnar waveguide plate is utilized for displaying an image, and the image projection device is used for projecting the image to the bottom of the columnar waveguide plate.

9 Claims, 6 Drawing Sheets

CIRCULAR DISPLAY DEVICE WITH A PROJECTIVE LIGHT SOURCE

BACKGROUND OF THE INVENTION

1. Field of the Invention

The present invention relates to a circular display device, and more particularly, to a circular display device for displaying an image on an outer surface of a columnar waveguide plate with a projective light source.

2. Description of the Prior Art

Large display devices can be used to communicate information to a large number of people in advertisements. Large outdoor display devices often utilize light emitting diodes (LEDs) to be the light source. However, the maintenance of the large display device costs much due to a large number of LEDs. Otherwise, a television wall also can be utilized for advertisements, but the grid of the television wall due to the partition of televisions decreases the image quality. For solving above-mentioned problems, a 360 degrees circular display device is utilized.

Please refer to FIG. 1. FIG. 1 is a drawing of a display apparatus 10 disclosed in U.S. Pat. No. 5,818,401. The display apparatus 10 includes a pedestal 12, a cylindrical body 14 rotatably mounted on the pedestal 12, and a plurality of LED arrays 16 secured on the wall of the cylindrical body 14. Each LED array 16 includes a plurality of LEDs 18. When the cylindrical body 14 rotates at a speed in which a viewer's eyes cannot distinguish that the individual LED array 16 and the LEDs 18 are sequentially turned on, a viewer sees the corresponding image on the rotating cylindrical body 14 due to the persistence of vision. Please refer to FIG. 2. FIG. 2 is a drawing of a display apparatus 20 disclosed in U.S. Pat. No. 6,335,714. The display apparatus 20 includes a pedestal 22, a cylindrical body 24 rotatably mounted on the pedestal 22, and a plurality of LED sections 26 secured on the wall of the cylindrical body 24. Each LED section 26 includes a plurality of LEDs 28. When the cylindrical body 24 rotates at a speed in which a viewer's eyes cannot distinguish that the individual LED section 26 and the LEDs 28 are sequentially turned on, a viewer sees the corresponding image on the rotating cylindrical body 24 due to the persistence of vision. Generally, the method for displaying images using LEDs has disadvantages of large pixels and non-uniform illumination, decreasing the image quality.

SUMMARY OF THE INVENTION

It is therefore a primary objective of the claimed invention to provide a circular display device for displaying an image on an outer surface of a columnar waveguide plate with a projective light source for solving the above-mentioned problem.

According to claimed invention, a circular display includes a columnar waveguide plate and an image projection device. The upper width of the cross-section of the columnar waveguide plate is less than the bottom width of the cross-section of the columnar waveguide plate. The outer surface of the columnar waveguide plate is utilized for displaying an image, and the image projection device is used for projecting the image to the bottom of the columnar waveguide plate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
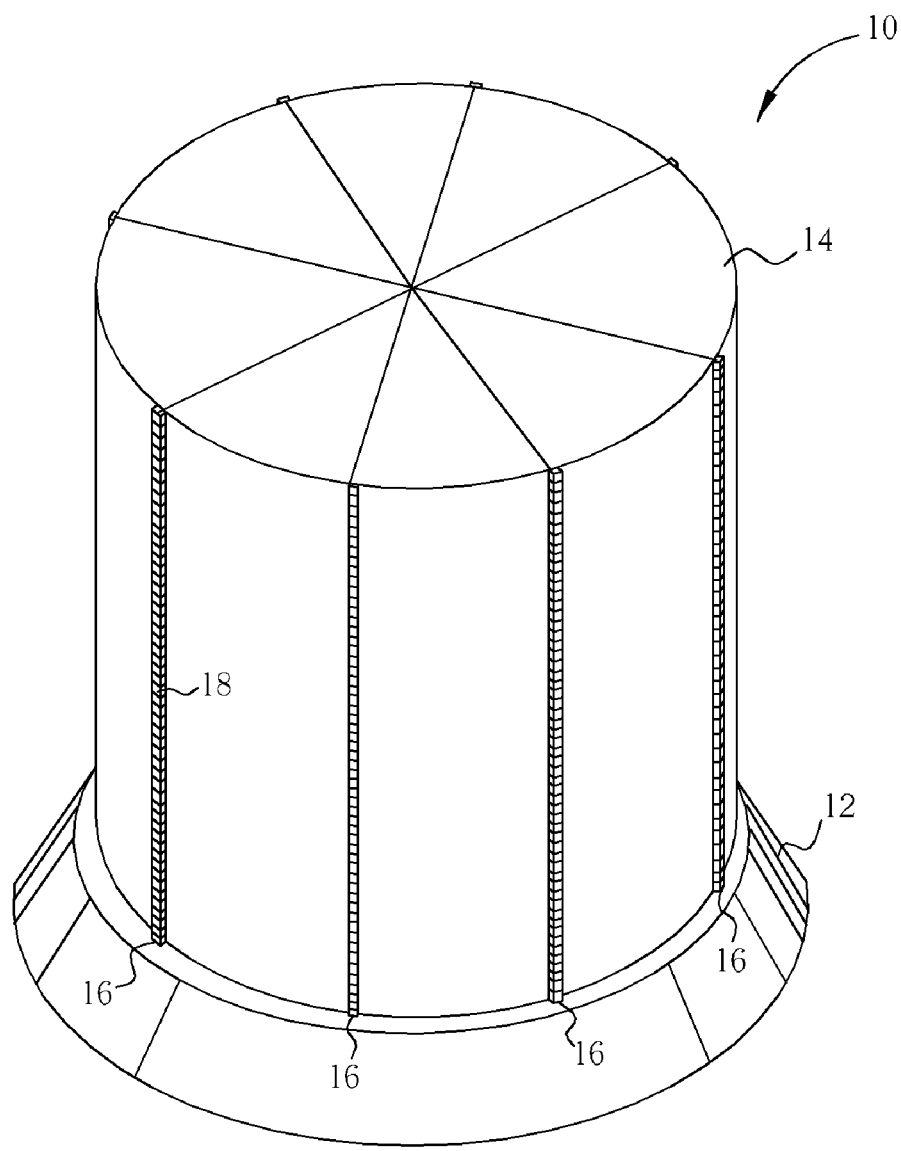
FIG. 1 is a drawing of a display apparatus disclosed in U.S. Pat. No. 5,818,401.
Figure 2:
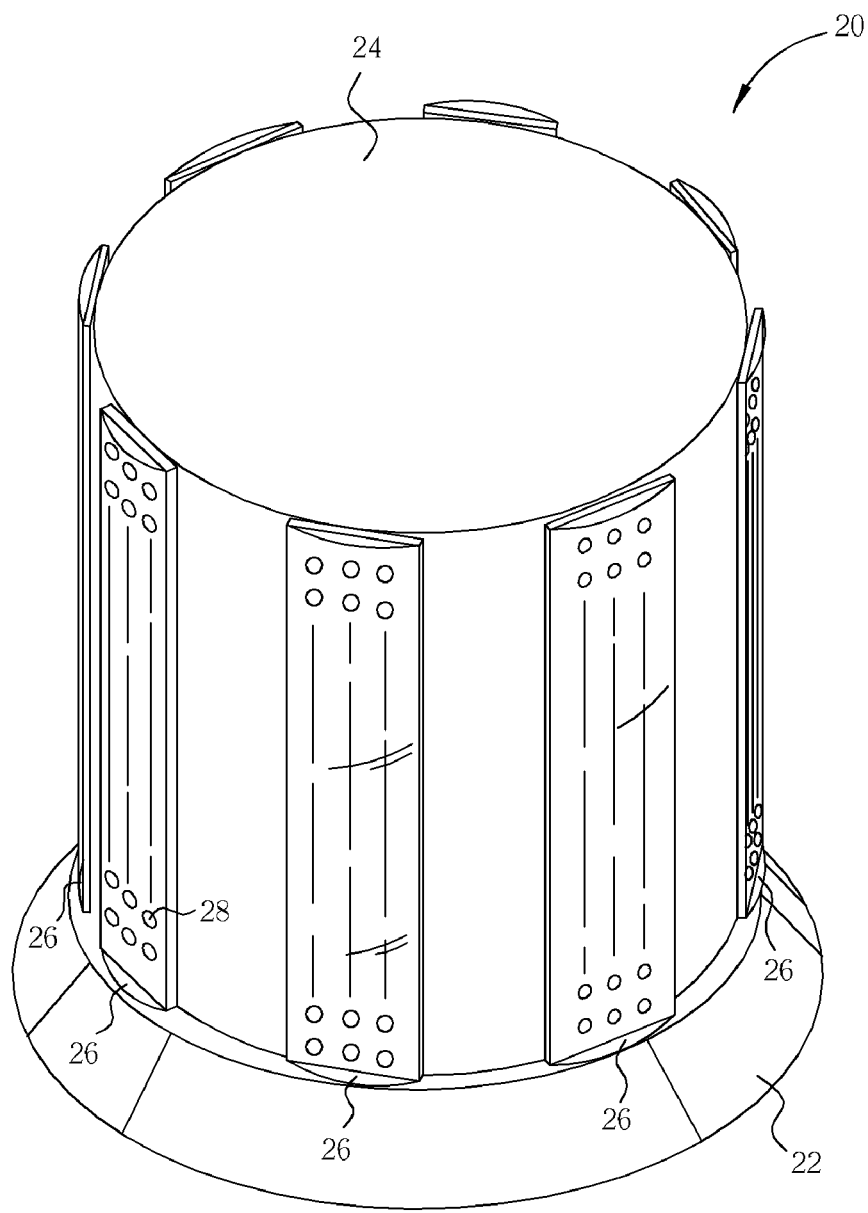
FIG. 2 is a drawing of a display apparatus disclosed in U.S. Pat. No. 6,335,714.
Figure 3:
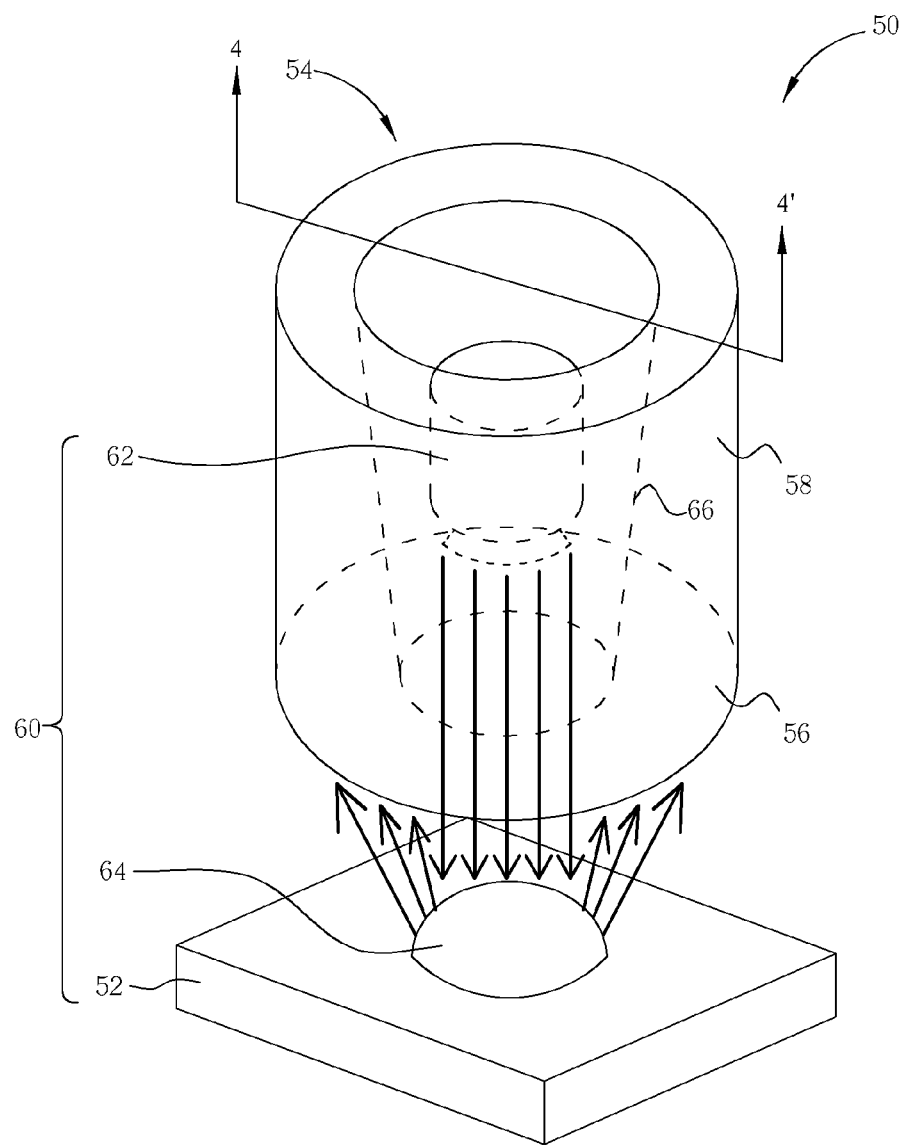
FIG. 3 is a drawing of a circular display of a first embodiment according to the present invention.

Please refer to FIG. 3. FIG. 3 is a drawing of a circular display 50 of a first embodiment according to the present invention. The circular display 50 includes a columnar waveguide plate 54. The columnar waveguide plate 54 is a cylindrical-shaped hollow waveguide plate, and a cross-section of the columnar waveguide plate 54 is a wedge-shaped section. The columnar waveguide plate 54 includes a light entrance plane 56 positioned on the bottom of the columnar waveguide plate 54, and a light exit plane 58 positioned on the outer surface of the columnar waveguide plate 54. The circular display 50 further includes an image projection device 60. The image projection device 60 includes a base 52 installed below the columnar waveguide plate 54, a projection module 62 installed inside columnar waveguide plate 54 for projecting a plurality of modulated light beams for forming an image, and a hemispherical reflecting surface 64 positioned on a side of the columnar waveguide plate 54 for reflecting light emitted from the projection module 62 to the light entrance plane 56 of the columnar waveguide plate 54. The hemispherical reflecting surface 64 is formed on the base 52 by plating a reflective material, such as metal material, on a hemispherical protrusion of the base 52 or by installing a hemispherical metal structure on the base 52.

Figure 4:
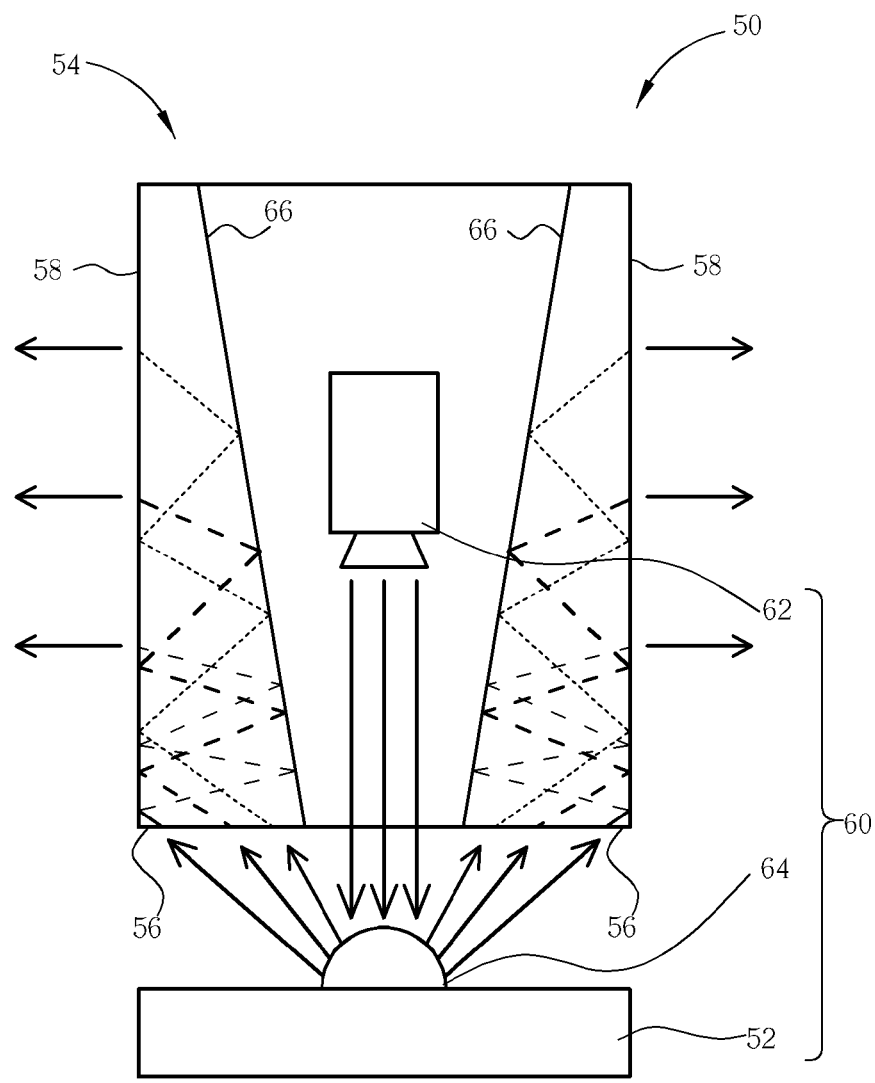
FIG. 4 is a cross-sectional view of the circular display along 4–4' axis in FIG. 3 according to the present invention.

Please refer to FIG. 4. FIG. 4 is a cross-sectional view of the circular display 50 along 4–4' axis in FIG. 3 according to the present invention. As shown in FIG. 3 and FIG. 4, the projection module 62 of the image projection device 60 projects the light for forming the image on the hemispherical reflecting surface 64 on the base 52, and the hemispherical reflecting surface 64 reflects the light emitted from the projection module 62 uniformly in 360 degrees due to the symmetry in 360 degrees of the hemispherical reflecting surface 64. The light entrance plane 56 of the columnar waveguide plate 54 is also symmetric in 360 degrees, so the light entrance plane 56 of the columnar waveguide plate 54 receives the light reflected from the hemispherical reflecting surface 64 uniformly. After the light enters the columnar waveguide plate 54 via the light entrance plane 56, the incident angle of the light to the light exit plane 58 decreases gradually through a reflection effect performed by a wedge plane 66 so as to form the image from bottom to top by controlling the total reflection of the light transmitting inside the columnar waveguide plate 54. Furthermore, since the incident angle of the light emitted from the projection module 62 to the hemispherical reflecting surface 64 is equal to the reflected angle of the light reflected from the hemispherical reflecting surface 64, the incident angles of the light emitted to the light entrance plane 56 of the columnar waveguide plate 54 are different due to the different reflected angles of the light reflected from the hemispherical reflecting surface 64 corresponding to the different incident angles of the light emitted from the projection module 62 to the hemispherical reflecting surface 64. The paths of the light of the different incident angles to the light entrance plane 56 are different, so the locations where the light passes through the light exit plane 58 of the columnar waveguide plate 54 outwardly are different. According to the above-mentioned optical characteristics, the image can be displayed on the light exit plane 58 of the columnar waveguide plate 54 correctly by controlling the angle between the columnar waveguide plate 54 and the hemispherical reflecting surface 64, the angle between the wedge plane 66 and the light exit plane 58, and the material of the columnar waveguide plate 54 (a refractive index of the columnar waveguide plate 54), and so on.

Figure 5:
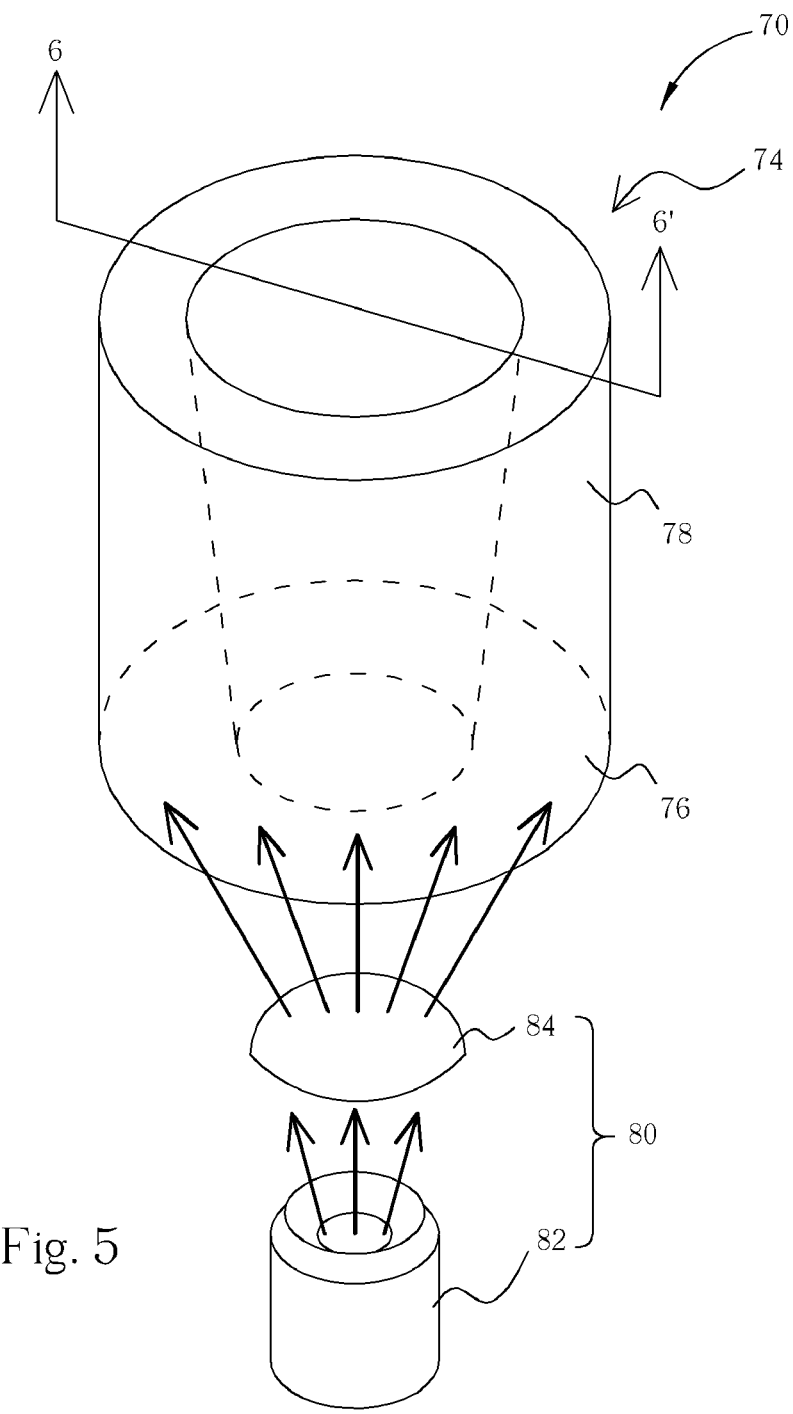
FIG. 5 is a drawing of a circular display of a second embodiment according to the present invention.

The image source of the circular display according to the present invention can be installed below the columnar waveguide plate. Please refer to FIG. 5. FIG. 5 is a drawing of a circular display 70 of a second embodiment according to the present invention. The circular display 70 includes a columnar waveguide plate 74. The structure of the columnar waveguide plate 74 is the same as the columnar waveguide plate 54 of the first embodiment. The columnar waveguide plate 74 is a cylindrical-shaped hollow waveguide plate, and a cross-section of the columnar waveguide plate 74 is a wedge-shaped section. The columnar waveguide plate 74 includes a light entrance plane 76 positioned on the bottom of the columnar waveguide plate 74, and a light exit plane 78 positioned on the outer surface of the columnar waveguide plate 74. The circular display 70 further includes an image projection device 80. The image projection device 80 includes a projection module 82 installed on a side of the columnar waveguide plate 74 for projecting a plurality of modulated light beams for forming an image, and a lens group 84 installed between the columnar waveguide plate 74 and the projection module 82 for refracting light emitted from the projection module 82 to the light entrance plane 76 of the columnar waveguide plate 74.

Figure 6:
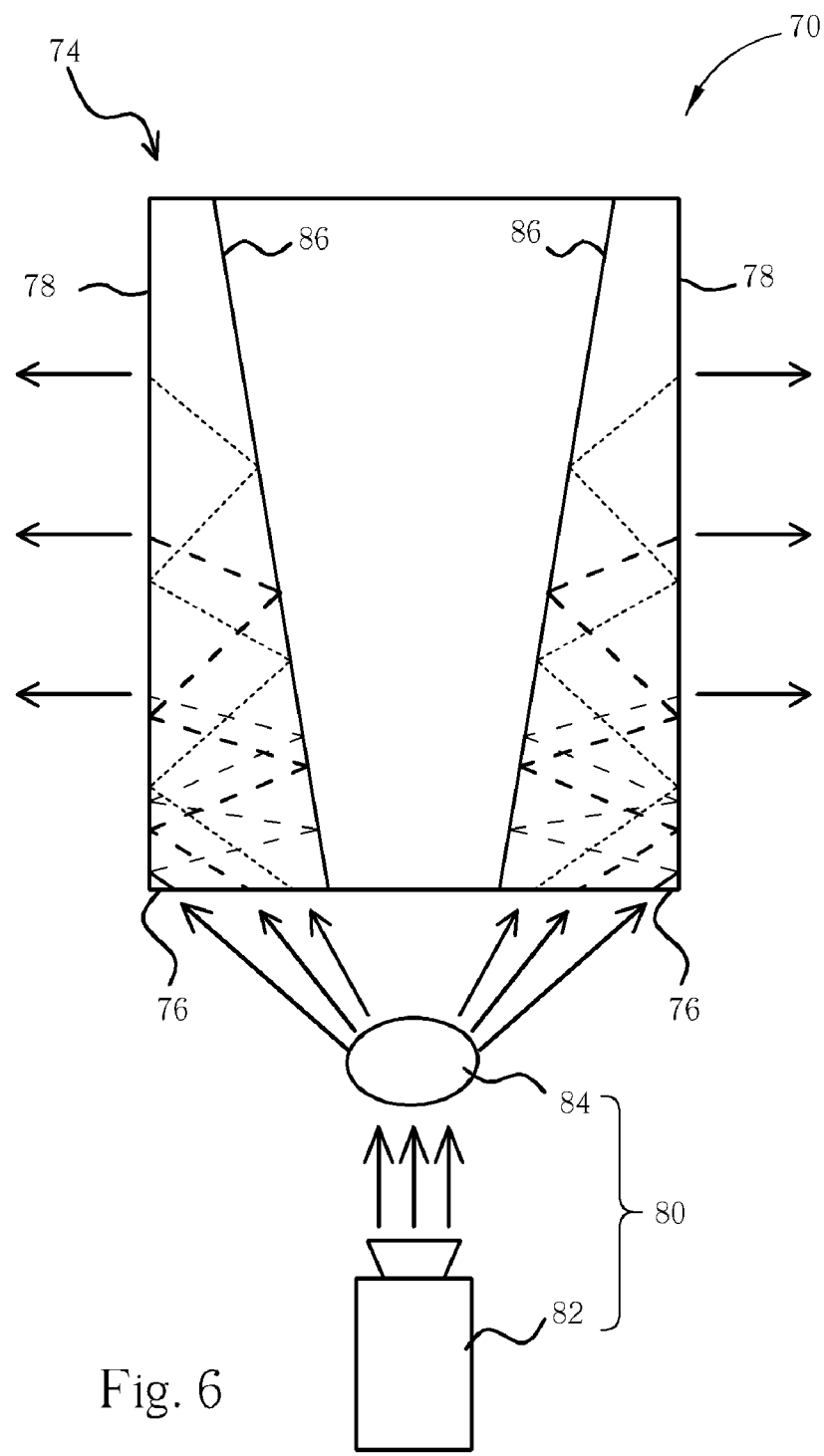
FIG. 6 is a cross-sectional view of the circular display along 6–6' axis in FIG. 5 according to the present invention.

Please refer to FIG. 6. FIG. 6 is a cross-sectional view of the circular display 70 along 6–6' axis in FIG. 5 according to the present invention. As shown in FIG. 5 and FIG. 6, the projection module 82 of the image projection device 80 projects the light for forming the image on the lens group 84, and the lens group 84 is capable of adjusting the paths of the light and refracting the light to the light entrance plane 76 of the columnar waveguide plate 74. After the light enters the columnar waveguide plate 74 via the light entrance plane 76, the incident angle of the light to the light exit plane 78 decreases gradually through a reflection effect performed by a wedge plane 86 so as to form the image from bottom to top by controlling the total reflection of the light transmitting inside the columnar waveguide plate 74. Similarly, the image can be displayed on the light exit plane 78 of the columnar waveguide plate 74 correctly by controlling the related location of the columnar waveguide plate 74 and the lens group 84, the optical characteristics of the lens group 84, and so on.

In contrast to the conventional circular display, the circular display according to the present invention displays the image with a projection manner so as to overcome the disadvantages of large pixels and non-uniform illumination of LED light sources and to increase the image quality. Furthermore, there is only one light source in the circular display according to the present invention instead of utilizing multiple LEDs so that the cost decreases and the structure design is simplified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circular display comprising:
    a columnar waveguide plate, an upper width of an outer section of the columnar waveguide plate being less than a bottom width of the outer section of the columnar waveguide plate, an outer surface of the outer section of the columnar waveguide plate used for presenting an image; and
    an image projection device for projecting the image to the bottom of the outer section of the columnar waveguide plate, the image projection device comprising:
        a projection module for projecting the image; and
        a hemispherical reflecting surface positioned on a side of the columnar waveguide plate for reflecting light emitted from the projection module to the bottom of the outer section of the columnar waveguide plate.

2. The circular display of claim 1 wherein the projection module is positioned on the other side of the columnar waveguide plate.

3. The circular display of claim 1 wherein the image projection device further comprises a base wherein the hemispherical reflecting surface is formed on the base.

4. The circular display of claim 1 wherein the columnar waveguide plate is a cylindrical-shaped hollow waveguide plate.

5. The circular display of claim 1 wherein a cross-section of the outer section of the columnar waveguide plate is a wedge-shaped section.

6. A circular display comprising:
    a columnar waveguide plate, an upper width of an outer section of the columnar waveguide plate being less than a bottom width of the outer section of the columnar waveguide plate, an outer surface of the outer section of the columnar waveguide plate used for presenting an image; and
    an image projection device for projecting the image to the bottom of the outer section of the columnar waveguide plate, the image projection device comprising:
        a projection module for projecting the image; and
        a lens group installed on a side of the columnar waveguide plate for refracting light emitted from the projection module to the bottom of the outer section of the columnar waveguide plate.

7. The circular display of claim 6 wherein the lens group is positioned between the columnar waveguide plate and the projection module.

8. The circular display of claim 6 wherein the columnar waveguide plate is a cylindrical-shaped hollow waveguide plate.

9. The circular display of claim 6 wherein a cross-section of the outer section of the columnar waveguide plate is a wedge-shaped section.

* * * * *

UNITED STATES PATENT AND TRADEMARK OFFICE
CERTIFICATE OF CORRECTION

| | | |
|---|---|---|
| PATENT NO. | : 7,123,811 B1 | Page 1 of 1 |
| APPLICATION NO. | : 11/162227 | |
| DATED | : October 17, 2006 | |
| INVENTOR(S) | : Jyh-Long Chern et al. | |

It is certified that error appears in the above-identified patent and that said Letters Patent is hereby corrected as shown below:

On the title page item(75), correct the name of the first inventor from "Jyh-Long Chen" to --Jyh-Long Chern--.

Signed and Sealed this

Eighteenth Day of March, 2008

JON W. DUDAS
*Director of the United States Patent and Trademark Office*